Patented Sept. 8, 1936

2,053,274

UNITED STATES PATENT OFFICE 2,053,274

PRODUCTION AND USE OF DYESTUFFS

George Holland Ellis and Frank Brown, Spondon, near Derby, England, assignors to Celanese Corporation of America, a corporation of Delaware No Drawing. Application February 7, 1933, Serial No. 655,615. In Great Britain February 17, 1932

19 Claims. (Cl. 8—5)

This invention relates to the manufacture and application of new dyestuffs of the anthraquinone series, which dyestuffs are more particularly of value in the colouration of cellulose ester and ether materials, and is a continuation in part of U. S. application S. No. 655,614 filed February 7, 1933.

In our co-pending U. S. application S. No. 655,614 we have described a series of valuable anthraquinone derivatives containing in one α-position a hydroxyl group, in a second α-position an amino or a non-aromatically substituted amino group and in a third α-position an arylamino group, which compounds constitute very valuable colouring matters for cellulose ester and ether materials.

These new dyestuffs may be represented by the following formula:—

wherein A represents anthraquinone and X, Y and Z represent alpha substituents, one of which is a hydroxyl group, one an aryl substituted amino group and the third a free amino group, or a non-aromatically substituted amino group, i. e. an amino group substituted only by a wholly aliphatic residue or other residue such that carbon of an aromatic nucleus if present therein is not directly attached to the amino nitrogen. By means of dyestuffs of this series, more especially by dyestuffs in which the arylamino group is in a para position to either the hydroxyl group or the other amino group, especially the latter, blue shades of exceptional resistance to the usual agencies may be obtained. For example 1-amino-4-phenylamino-5-hydroxy anthraquinone dyes cellulose acetate material in pure blue shades of excellent fastness to light and to light in the presence of acid fumes such as combustion products of coal gas. Coupled with these valuable properties the dyestuff displays very good affinity for the material.

We have further found that compounds of the foregoing type in which the anthraquinone residue contains further substituents are also valuable products in that by their aid valuable colourations may be produced on cellulose ester and ether materials.

Thus in addition to the specified groups in the 1-, 4-, and 5-positions, substituent atoms or groups may be present in other positions. Such further substituents may be of the same character as those in the 1:4:5-positions or they may be of different character. For example further hydroxy, amino, aliphatically substituted amino, or arylamino groups may be present but especially a further hydroxyl group. Particular mention may be made of compounds containing as further substituent an α-hydroxyl group, for instance 1-amino-4-phenylamino-5:8-dioxy-anthraquinone and its isomer 4-amino-8-phenyl-amino-1:5-dioxy-anthraquinone, which dye cellulose acetate in greenish blue shades of exceptional resistance to the action of light in the presence of acid.

The dyestuffs may be represented by the general formula:—

wherein A represents an anthraquinone residue, X, Y and Z α-substituents, one of which is a hydroxyl group, one an arylamino group and the third an unsubstituted amino group or a non-aromatically substituted amino group, and B represents a substituent of the type of X, Y and Z or of a different type.

We have also found that anthraquinone derivatives containing a hydroxy group, an amino or aliphatically substituted amino group and an arylamino group, and in which these groups have other than the 1:4:5-orientation are also valuable colouring matters. This is more particularly the case if at least two of the three characteristic substituents, preferably the two amino substituents are in para position to each other as, for instance, in 1-amino-2-oxy-4-phenyl-amino-anthraquinone.

As in the case of the anthraquinone derivatives of U. S. application S. No. 655,614 the aryl substituent of the aryl substituted amino group may be of any desired character, for example of the benzene, naphthalene or other series, but is preferably of the benzene series. It may be substituted in any desired manner. Thus, for example, it may contain alkyl, hydroxy, alkoxy, amino, halogen or other substituents. Special reference may be made to the presence of acidylamino groups, to increase the affinity of the dyestuff for the material, as described in co-pending U. S. application S. No. 655,617 filed February 7, 1933. Again, increased affinity may be imparted by the presence of an alkyl group or other substituent in the meta-position to the amino group, as described in co-pending U. S. application S. No.

655,613 filed February 7, 1933, Patent Number 2,029,312 of February 4, 1936, and alkyloxy groups especially in the ortho-position to the amino group may be present, whereby a still further increase of resistance to acid fading may be secured (see co-pending U. S. application S. No. 655,616 filed February 7, 1933, Patent Number 2,029,313 of February 4, 1936). The second hydrogen atom of the aryl substituted amino group may also be substituted, for example by means of an alkyl or other aliphatic residue. The substituent of the non-aromatically substituted amino group of the anthraquinone derivatives may be of any desired character provided that the amino nitrogen is not directly attached to carbon of an aromatic nucleus of the substituent. As examples of suitable non-aromatic substituents mention may be made of methyl or ethyl or other alkyl groups, substituted alkyl groups, for example hydroxy-ethyl, hydroxy-propyl or γ-chlor-β-hydroxy propyl, aliphatic acidyl groups, for example acetyl, hydrogenized aromatic residues for example cyclohexyl or substituted cyclohexyl groups, and aralkyl groups or hydrogenized aralkyl groups for example benzyl or hydrogenized benzyl residues. If desired the substituent may be united at two points to the amino nitrogen so as to form a heterocyclic system, as an example of which may be mentioned the piperidyl group. Two separate non-aromatically linked substituents may be present in the amino group in question if desired.

Most satisfactory results have been obtained when the amino group is either unsubstituted or substituted only by methyl, ethyl or other aliphatic residue of relatively low molecular weight.

These new dyestuffs may be produced in various ways. More particularly they may be produced from anthraquinone compounds substituted in the 1:4:5-positions and/or other appropriate positions by reactive atoms or groups by replacing the said reactive atoms or groups by or converting them into the desired hydroxyl, amino, arylamino and/or other desired groups or atoms. It will be appreciated that the parent compounds may already contain one or other of the desired groups or atoms in the appropriate position in the nucleus and in such case it may only be necessary to replace one or two replaceable atoms or groups by hydroxyl, amino, arylamino, or other groups. Other parent materials may comprise compounds containing the desired hydroxyl, amino, substituted amino, and other atoms or groups in the required positions and in addition other groups, for example sulphonic groups, which may be readily eliminated in order to obtain the desired compounds.

It will be appreciated that the dyestuffs of the general formula:—

previously given may be obtained from tetra-substituted anthraquinones of which three substituents are three of X Y Z and B while the fourth is a replaceable or convertible atom or group, by treatment so as to convert into the fourth of the required substituents the said replaceable or convertible atom or group.

As examples of replaceable or convertible atoms or groups mention may be made of sulphonic groups, hydroxyl, alkoxy, and aryloxy groups, nitro groups, amino and substituted amino groups, and chlorine or other halogen atoms. Sulphonic groups may for instance be converted into hydroxyl groups by the action of alkalies, particularly weak alkalies such as milk of lime or solutions of alkali carbonates, or into amino or substituted amino groups by the action of ammonia or the corresponding substituted ammonias. Hydroxyl or alkoxyl groups may similarly be converted into amino groups or substituted amino groups by the action of ammonia or aliphatic or aromatic amines. Nitro groups may for instance be converted into amino groups by reduction, or into substituted amino groups by direct reaction with aliphatic or aromatic amines. The hydrogen of amino groups may be substituted by acyl or hydrocarbon or other radicles by the action of appropriate acylating, alkylating or aralkylating or other agents. Chlorine and other halogen atoms may readily be converted into hydroxyl groups by the action for instance of concentrated sulphuric acid, especially in the presence of boric acid, or by the action of alkalies, especially weak alkalies such as calcium hydroxide. Again, they may be converted into amino groups or substituted amino groups by reaction with ammonia or substituted ammonias. One convenient method of replacing halogen atoms by amino groups is to condense the halogen compound with an arylsulphonamide phthalimide or other acid amide and then to saponify the acidylamino compound so obtained.

The replacement of hydroxyl groups by amino or hydroxyl and amino groups by substituted amino groups by the direct action of ammonia or substituted ammonia may frequently be facilitated by first reducing the anthraquinone compound to a leuco derivative. Such is especially the case when compounds contain hydroxyl or hydroxyl and amino groups in the 1:4-positions. The amidation of reduced hydroxy anthraquinone compounds may if desired be effected in the presence of inorganic alkali in the manner described in U. S. application S. No. 331,390 filed 9th January, 1929 Patent Number 1,969,748 of August 14, 1934.

The replacement of hydroxyl groups by arylamino groups by the action of aromatic amines may be effected in the presence of boric acid or similarly acting substances.

As examples of suitable parent materials containing reactive groups mention may be made of the following:—4:5-diamino- or 4:5-dinitro-chrysazin, 4:8-diamino- or 4:8-dinitro-anthrarufin, 4:5-dichlorchrysazin, dichloroanthrarufin (obtainable for instance by action of sulphuryl chloride on anthrarufin). 1:5:4:8- or 1:8:4:5-dichlor-dinitro - anthraquinone, 1:4:5:8-tetraoxy-anthraquinone, 1:2:5:8 - tetraoxyanthraquinone, 1-amino- or 1-nitro-4:5:8-trioxyanthraquinone, and 1-amino-4-anilido-2-brom or 2-sulpho-anthraquinone.

The chlorinated trihydroxy anthraquinone obtainable by the action of concentrated sulphuric acid on dichloranthrarufin in the manner described in U. S. application S. No. 492,353, filed 30th October, 1930, Patent Number 1,969,735 of August 14, 1934 may be condensed, preferably in the form of a leuco compound, with 1 molecular proportion of ammonia so as to replace only one of the para-hydroxyl groups, and the resulting product subjected to the action of aniline, paratoluidine or other aromatic amine in order to effect replacement of the other of the para hydroxy groups. Again, 1-amino-4:5:8-trihydroxy anthraquinone may be subjected to the action of aniline so as to replace the 4-hydroxyl group by an anilido residue with the formation of 1 - amino - 4 - anilido-5:8-dihydroxy - anthraquinone.

For the production of the valuable aminodioxy-arylamino-anthraquinones especially those in which the substituents are in α-position it has been found particularly advantageous to take a dioxy-anthraquinone containing two suitable substituents, e. g. halogen or nitro, and to replace the latter in succession in either order by an arylamino group and an amino group which is unsubstituted or is non-aromatically substituted. If, of course, one of the two substituents is already of the desired character only the remaining one may require replacement.

Particular mention may be made of the production of the especially valuable amino- dioxy- arylamino-anthraquinones, in which the substituents are in α position of the anthraquinone nucleus, from dinitro-anthrarufin and dinitro-chrysazin by the methods indicated. Exceedingly valuable is the process wherein the said dinitro-dioxy-anthraquinones are first caused to react with an arylamine so as to replace only one nitro group by an arylamino group, the remaining nitro group being then reduced to amino or replaced by an aliphatically substituted amino group by the action of an aliphatic amine, e. g. methylamine or oxyethylamine.

In this manner 4-amino-8-phenylamino-1:5-dioxyanthraquinone may be obtained from dinitro-anthrarufin and 4-amino-5-phenyl-amino-1:8-dioxy-anthraquinone from dinitro-chrysazin.

The replacement of the nitro group by arylamino is conveniently effected by heating the dinitro-dioxy-anthraquinone with an arylamine at water bath temperatures for several hours, e. g. 8 hours. The reduction of the remaining nitro group may be effected in any desired way but we have found that particularly good results are obtained when reduction is effected by means of reducing sugars and alkalies in aqueous media, for example aqueous glucose and caustic soda.

The new colouring matters, as indicated above, are of especial value for the colouration of cellulose acetate and other cellulose ester or ether materials. As examples of such other esters and ethers reference may be made to cellulose formate, propionate or butyrate or the products obtainable by treating alkalized cellulose with esterifying agents or the ethyl, benzyl or other ethers of cellulose. They may also be applied to mixed materials comprising one or more of the aforesaid cellulose esters or ethers in admixture with other textile fibres, for example wool, silk or other animal fibres, or cotton, regenerated cellulose or other cellulosic materials. Such other fibres may be coloured by the same dyestuffs as the cellulose esters or ethers when they possess the requisite affinity, or they may be coloured either in the same or different shades by means of other dyestuffs, either before, after or simultaneously with the colouration of the cellulose esters or ethers.

The said colouring matters may be applied to textile materials either in the reduced state, that is by a vat process or in the form of free leuco compounds in the manner described in U. S. application S. No. 459,828 filed 5th June 1930, Patent Number 1,900,172 of March 7, 1933, or they may be applied in solution where sufficiently soluble, in aqueous suspension, or after being brought into colloidal form.

For convenience in application, the new colouring matters may be converted into concentrated or other preparations, whether liquid or solid or semi-solid, in which the colouring matters are present in the reduced or unreduced state and in colloidal, dispersed, or other finely divided condition. Such preparations are included within the scope of the invention and may be prepared for example, by grinding (e. g. in colloid mills), by dissolving in a solvent and mixing with water containing or not containing protective colloids and/or dispersators, or by treatment with dispersing agents whether alone or in the presence of protective colloids and/or liquids, e. g. water. Preparations intended for vatting may contain reducing agents, alkali or the like, e. g. alkali salts of hydroxy and polyhydroxy cyclic compounds (see U. S. Patent No. 1,716,720). As examples of dispersing agents or protective colloids mention may be made of the following:—

Sulphoaromatic fatty acid compounds, e. g. sulpho-benzene palmitic acid compound (see U. S. Patent No. 1,694,413).

Sulphoaromatic ricinoleic acid compounds, e. g. sulphonaphthalenericinoleic acid (see U. S. Patent No. 1,840,572).

Naphthenic acids or other carbocyclic compounds containing salt-forming groups or salts of such acids or compounds (see U. S. Patent No. 1,618,414).

Sulphonated oil compounds, e. g. sulphonated castor oil.

Sulphuric esters of higher aliphatic alcohols.

Furfural-naphthalene sulphonic acid compounds (see U. S. application S. No. 390,423 filed 4th September, 1929), Patent Number 1,928,647 of October 3, 1933.

Resino-naphthalene sulphonic acid compounds (see U. S. application S. No. 390,424 filed 4th September, 1929), Patent Number 1,959,352 of May 22, 1934.

Formaldehyde naphthalene sulphonic acid compounds.

Alkyl-, cycloalkyl-, and aralkyl-naphthalene sulphonic acids.

Sulphite cellulose waste liquor or its constituents or products of transformation, e. g. lignin sulphonic acid compounds.

Sulphonic acid compounds of mineral oils, tar oils, brown coal tar oils, and the like, and their products of condensation with alcohols.

Sulphonic acid compounds of distillation residues of benzaldehyde.

Carbohydrates including gums.

Glue and gelatine.

By addition of or dilution with water the aforesaid preparations containing unreduced unsulphonated colouring matters yield aqueous suspensions or colloidal solutions which may be directly employed for the colouration of cellulose acetate or other organic substitution derivatives of cellulose. The preparations containing reduced or unreduced colouring matters may be employed for the preparation of dye vats for the colouration of cellulose acetate or other organic substitution derivatives of cellulose or other textile materials.

The colouring matters may be applied to the materials in any desired manner, for example by dyeing or other method of uniform application, or by printing, stencilling or other method of local application. If desired the new colouring matters may be employed for the colouration of stannous chloride discharges in the manner described in U. S. application S. No. 523,837, filed 19th March, 1931.

The invention is illustrated but not limited by the following examples:—

*Example 1*

Preparation of 4-amino-8-phenylamino-1:5-dioxy anthraquinone.

1 part of pure 4:8-dinitro-anthrarufin is heated on the water bath with 4 parts of aniline for 8 hours, during which time the colour of the solution changes from yellow to greenish-blue. Upon pouring the cooled melt into an excess of dilute hydrochloric acid there is obtain a suspension of 4-nitro-8-phenylamino-1:5-dioxy-anthraquinone. This is filtered off and reduced to 4-amino-8-phenylamino-1:5-dioxy-anthraquinone by heating at 80° C. for 1 hour with 30 parts of water, 0.5 part caustic soda, and 1.5 parts of glucose. The new dyestuff is obtained as a reddish blue powder, soluble in methylated spirit to a greenish-blue solution.

*Example 2*

Preparation of 4-amino-5-paratolylamino-1:8-dioxy-anthraquinone.

1 part of 4:5-dinitro-1:8-dioxy-anthraquinone is heated on the water bath for 8 hours with 4 parts of paratoluidine. The reaction follows an analogous course to that of Example 1, subsequent isolation and reduction proceeding as detailed therein.

*Example 3*

Arylidation of 1:4:5-trioxy-8-amino-anthraquinone.

1 part of 1:4:5-trioxy-8-amino-anthraquinone, 1 part of boric acid, and 5 parts of ortho- anisidine, are heated at the boiling point for a few minutes, the solution becoming bright blue. After separating from excess of o-anisidine, the new dyestuff may be purified by recrystallization from amyl alcohol.

*Example 4*

1 part of 1-amino-4:5:8-trioxyanthraquinone and 1 part of boric acid are boiled with 10 parts of aniline for half an hour.

After separation from excess aniline a product is obtained which is readily dispersible in water by means of Turkey red oil or other dispersing agent and from the dispersions so obtained yields on cellulose acetate materials blue shades exceptionally resistant to the combined actions of light and acid.

*Example 5*

To dye 10 kilograms of cellulose acetate knit fabric a pure blue shade.

1 kilogram of a paste consisting of one part of finely divided 4-amino-8-phenylamino-1:5-dioxyanthraquinone, 6 parts of water, and 3 parts of Turkey red oil (50%) is heated to the boil with 10 litres of 2.5 grams per litre soap solution, with stirring, and strained through a filter cloth into a dyebath containing 300 litres of 2.5 grams per litre soap solution. The previously scoured cellulose acetate fabric is now entered in rope form, and dyeing commenced cold or luke warm, the temperature being raised slowly to 80° C. and maintained thereat for 1½ hours or till the requisite shade is achieved. The goods are now washed off thoroughly and dried or otherwise treated as desired or requisite.

For printing cellulose acetate goods the dyestuff paste is suitably diluted and thickened with a gum thickening paste which may also contain swelling agents for cellulose acetate, e. g. methylated spirits. Printing, drying, steaming etc. follow according to known technique.

What we claim and desire to secure by Letters Patent is:—

1. As new products, amino anthraquinone derivatives containing a single arylamino group, said anthraquinone derivatives being α-α-dihydroxy anthraquinones substituted in one of the remaining α-positions by an arylamino group and in the other by a substituent selected from the group consisting of amino and non-aromatically substituted amino groups.

2. As new products, amino anthraquinone derivatives of the general formula:—

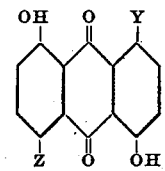

wherein Y represents an aryl amino group and Z an amino group or a non-aromatically substituted amino group.

3. As a new product, 1-amino-5-phenylamino-4:8-dioxyanthraquinone.

4. As new products, amino anthraquinone derivatives of the general formula:—

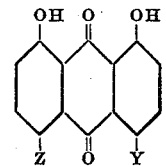

wherein Y represents an arylamino group and Z an amino group or a non-aromatically substituted amino group.

5. As new products, amino anthraquinone derivatives containing a single arylamino group, said anthraquinone derivatives being α-α-dihydroxy anthraquinones substituted in one of the remaining α-positions by an arylamino group of the benzene series and in the other by a substituent selected from the group consisting of amino and non-aromatically substituted amino groups.

6. As new products, amino anthraquinone derivatives of the general formula:—

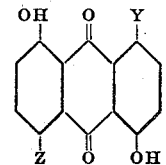

wherein Y represents an arylamino group of the benzene series and Z an amino group.

7. As new products, amino anthraquinone derivatives of the general formula:—

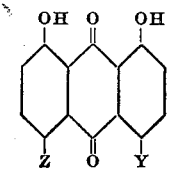

wherein Y represents an arylamino group of the benzene series and Z an amino group.

8. Process for the production of new amino anthraquinone derivatives containing a single arylamino group, said anthraquinone derivatives being α-α-dihydroxy anthraquinones substituted in one of the remaining α-positions by an arylamino group and in the other by a substituent selected from the group of amino and non-aromatically substituted amino groups, which comprises subjecting an α-α-dihydroxy anthraquinone containing replaceable atoms or groups in the remaining α-positions to treatment to replace one of the said replaceable groups by an arylamino group and to replace the other of the said groups by a substituent selected from the group consisting of amino and non-aromatically substituted amino groups.

9. Process for the production of 1-amino-4-arylamino-5:8-dihydroxy-anthraquinone wherein the arylamino group is of the benzene series, which comprises subjecting 1-amino-4:5:8-trihydroxy-anthraquinone to the action of an arylamine of the benzene series.

10. Process for the production of new dyestuffs from dinitro-anthrarufin or dinitro-chrysazin, which comprises replacing one nitro group by an arylamino group by the action of an arylamine and thereafter reducing the product.

11. Process for the production of new dyestuffs from dinitro-anthrarufin or dinitrochrysazin, which comprises replacing one nitro group by an aliphatically substituted amino group by the action of an aliphatic amine and thereafter replacing the other nitro group by an arylamino group by the action of an arylamine.

12. Process for the production of new dyestuffs from dinitro-anthrarufin or dinitro chrysazin, which comprises replacing one nitro group by an arylamino group of the benzene series by the action of an arylamine of the benzene series and thereafter reducing the product.

13. Process for the production of a new dyestuff from dinitro-anthrarufin, which comprises replacing one nitro group by a phenylamino group by the action of aniline and thereafter reducing the resulting product.

14. Process for the production of new dyestuffs from dinitro-anthrarufin, which comprises replacing one nitro group by a phenylamino group by the action of aniline and thereafter reducing the resulting product by means of a reducing sugar in the presence of an alkali.

15. A composition of matter comprising a dispersing agent and an amino anthraquinone derivative containing a single arylamino group, said anthraquinone derivative being an α-α-dihydroxy anthraquinone substituted in one of the remaining α-positions by an arylamino group and in the other by a substituent selected from the group consisting of amino and non-aromatically substituted amino groups.

16. A composition of matter comprising a dispersing agent and 1-amino-5-arylamine-4:8-dihydroxy-anthraquinone.

17. Process for the coloration of organic derivatives of cellulose, which comprises applying thereto an amino anthraquinone derivative containing a single arylamino group, said anthraquinone derivative being an α-α-dihydroxy anthraquinone substituted in one of the remaining α-positions by an arylamino group and in the other by a substituent selected from the group consisting of amino and non-aromatically substituted amino groups.

18. Process for the colouration of cellulose acetate, which comprises applying thereto an amino anthraquinone derivative containing a single arylamino group, said anthraquinone derivative being an α-α-dihydroxy anthraquinone substituted in one of the remaining α-positions by an arylamino group and in the other by a substituent selected from the group consisting of amino and non-aromatically substituted amino groups.

19. Process for the colouration of cellulose acetate, which comprises applying thereto 1:5-dihydroxy-4-phenylamino-8-amino anthraquinone.

GEORGE HOLLAND ELLIS.
FRANK BROWN.